UNITED STATES PATENT OFFICE.

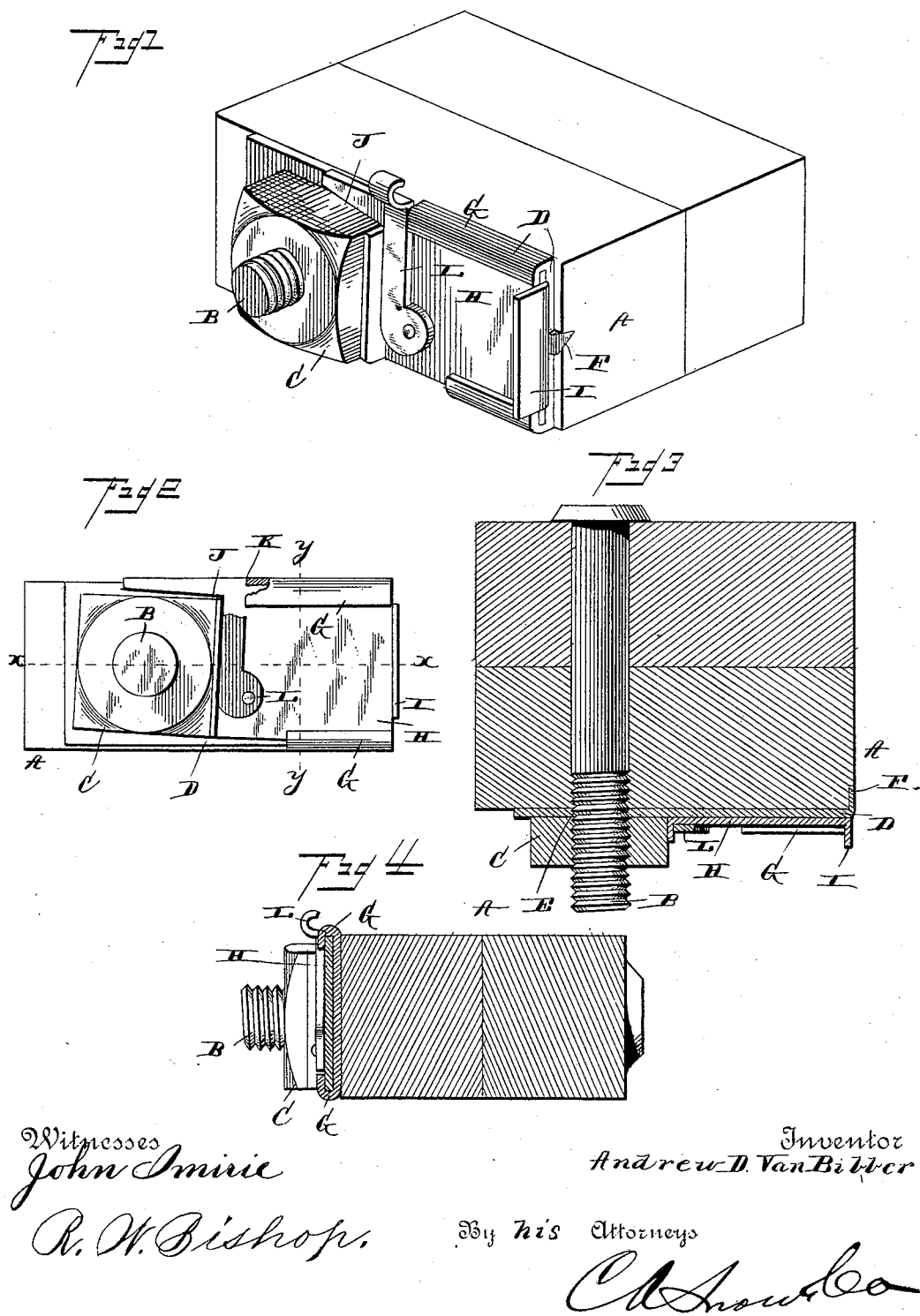

ANDREW D. VAN BIBBER, OF ZELA, WEST VIRGINIA.

NUT-LOCK.

SPECIFICATION forming part of Letters Patent No. 406,245, dated July 2, 1889.

Application filed December 6, 1888. Serial No. 292,790. (Model.)

*To all whom it may concern:*

Be it known that I, ANDREW D. VAN BIBBER, a citizen of the United States, residing at Zela, in the county of Nicholas, and State of West Virginia, have invented new and useful Improvements in Nut-Locks, of which the following is a specification.

My invention relates to improvements in nut-locks; and it consists in certain novel features hereinafter described and claimed.

In the accompanying drawings, Figure 1 is a perspective view of my improved nut-lock, showing it in its applied position. Fig. 2 is a front view of the same with a portion of the washer broken away. Fig. 3 is a sectional view on the line $x\ x$ of Fig. 2, and Fig. 4 is a sectional view on the line $y\ y$ of Fig. 2.

Referring to the drawings by letter, A designates a portion of a bridge or rail joint or other structure to which my improved nut-lock is applied.

B designates the bolt inserted through suitable bolt-holes in the said structure and having the securing-nut C mounted on its extremity, as shown.

The washer D consists of an elongated metallic plate provided with an opening E at one end, through which the bolt projects, and provided at its other end with a spur F, which is forced into the surface to which the washer is applied, thereby securing the washer in place. The washer is further provided, at its opposite edges, with the U-shaped flanges G, as shown.

H designates the sliding locking-plate, which has its edges engaging the U-shaped flanges on the washer, and is provided at its outer end with the lip I, which serves as a handle, as will be readily understood. The inner end of the locking-plate is provided with an angular notch J, which is adapted to engage two sides of the nut, as clearly shown in Figs. 1 and 2, and thereby prevent rotation of the nut. The upper edge of this locking-plate, near its inner end, is provided with a shoulder K, which is adapted to engage the end of the upper U-shaped flange of the washer to prevent premature withdrawal of the locking-plate. A spring L is pivoted on the locking-plate and is adapted to be turned at right angles thereto, so as to bear against the end of the flange of the washer, in order to prevent the withdrawal of the locking-plate. This spring may be dispensed with, if so desired; but I prefer to use it, as the efficiency of the device is thereby increased.

In practice the washer is secured to the parts to be fastened together in proper position, as shown in the drawings, and the bolt inserted through the aligned bolt-holes, as will be readily understood. The nut is then applied to the bolt and turned nearly home, after which the locking-plate is placed in potion and pushed inward against the nut, with the angular notch at its inner end engaging two sides of the nut, as shown. As the locking-plate is pushed inward, the nut will be turned slightly, so that it will be forced completely home against the washer, and this action will slightly raise the inner end of the locking-plate, so as to throw the shoulder K into engagement with the inner end of the washer, thereby locking the plate against premature or accidental withdrawal. The spring is then turned around at right angles, as described, and the locking completed. In order to remove the nut it is necessary to apply considerable force thereto, so that the nut will be turned sufficiently to lower the inner end of the locking-plate, and thereby disengage it from the washer, so that it can be withdrawn.

From the foregoing description, taken in connection with the accompanying drawings, it will be seen that I have provided an extremely simple and efficient nut-lock. My device is composed of few parts, which are compactly arranged, so as to occupy but very little space, and can be manufactured and sold at a slight cost.

Having thus described my invention, what I claim, and desire to secure by Letters Patent, is—

The combination, with the bolt and the nut, of the washer having a flange on its edge, the sliding locking-plate mounted on the washer and having a shoulder engaging the flange of the washer, and the spring pivoted on the locking-plate and adapted to be turned at right angles to bear against the end of the flange of the washer, as set forth.

In testimony that I claim the foregoing as my own I have hereto affixed my signature in presence of two witnesses.

ANDREW D. VAN BIBBER.

Witnesses:
JOHN D. ALDYSON,
WILLIAM G. GRAVES.